US012700950B2

(12) United States Patent (10) Patent No.: US 12,700,950 B2
Mu (45) Date of Patent: Aug. 4, 2026

(54) CONFIGURATION PARAMETER DETERMINATION METHOD, CONFIGURATION PARAMETER DETERMINATION APPARATUS, AND STORAGE MEDIUM

(71) Applicant: Beijing Xiaomi Mobile Software Co., Ltd., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 382 days.

(21) Appl. No.: 18/259,384

(22) PCT Filed: Dec. 30, 2020

(86) PCT No.: PCT/CN2020/141775
§ 371 (c)(1),
(2) Date: Jun. 26, 2023

(87) PCT Pub. No.: WO2022/141289
PCT Pub. Date: Jul. 7, 2022

(65) Prior Publication Data
US 2024/0063949 A1      Feb. 22, 2024

(51) Int. Cl.
*H04W 48/16*      (2009.01)
*H04L 1/16*      (2023.01)
*H04L 5/00*      (2006.01)

(52) U.S. Cl.
CPC ............... *H04L 1/16* (2013.01); *H04L 5/005* (2013.01)

(58) Field of Classification Search
CPC ... H04L 1/08; H04L 1/16; H04L 5/005; H04L 5/0053; H04W 52/02
See application file for complete search history.

(56) References Cited

U.S. PATENT DOCUMENTS

| | | | | |
|---|---|---|---|---|
| 10,306,546 | B2 * | 5/2019 | Park | H04W 74/006 |
| 10,951,359 | B2 * | 3/2021 | Huang | H04W 72/23 |
| 2016/0249331 | A1 * | 8/2016 | Park | H04L 5/0053 |
| 2022/0304037 | A1 * | 9/2022 | Zhang | H04L 1/08 |
| 2023/0354346 | A1 * | 11/2023 | Mu | H04L 5/0091 |

FOREIGN PATENT DOCUMENTS

| | | | | |
|---|---|---|---|---|
| CN | 104349458 | A | 2/2015 | |
| CN | 105659514 | A | 6/2016 | |
| CN | 109787710 | A | 5/2019 | |
| CN | 111901855 | A | 11/2020 | |
| WO | WO-2015050339 | A1 * | 4/2015 | H04B 7/26 |
| WO | WO-2023203627 | A1 * | 10/2023 | H04W 72/20 |

OTHER PUBLICATIONS

"Remaining issues on the Power Saving Signals/Channels," Proceedings of the 3GPP TSG RAN WG1 Meeting #100, CATT, R1-2000537, Feb. 24, 2020, e-Meeting, 5 pages.

* cited by examiner

*Primary Examiner* — Phuc H Tran
(74) *Attorney, Agent, or Firm* — McCoy Russell LLP

(57) ABSTRACT

A configuration parameter determination method includes: determining a first configuration parameter set, the first configuration parameter set being used for determining a transmission resource of a first type of common search space on the time domain, and the first configuration parameter set at least including: a control channel element (CCE) aggregation degree, and the number of retransmissions corresponding to the CCE aggregation level and/or the number of candidate transmission positions corresponding to the CCE aggregation degree.

16 Claims, 6 Drawing Sheets

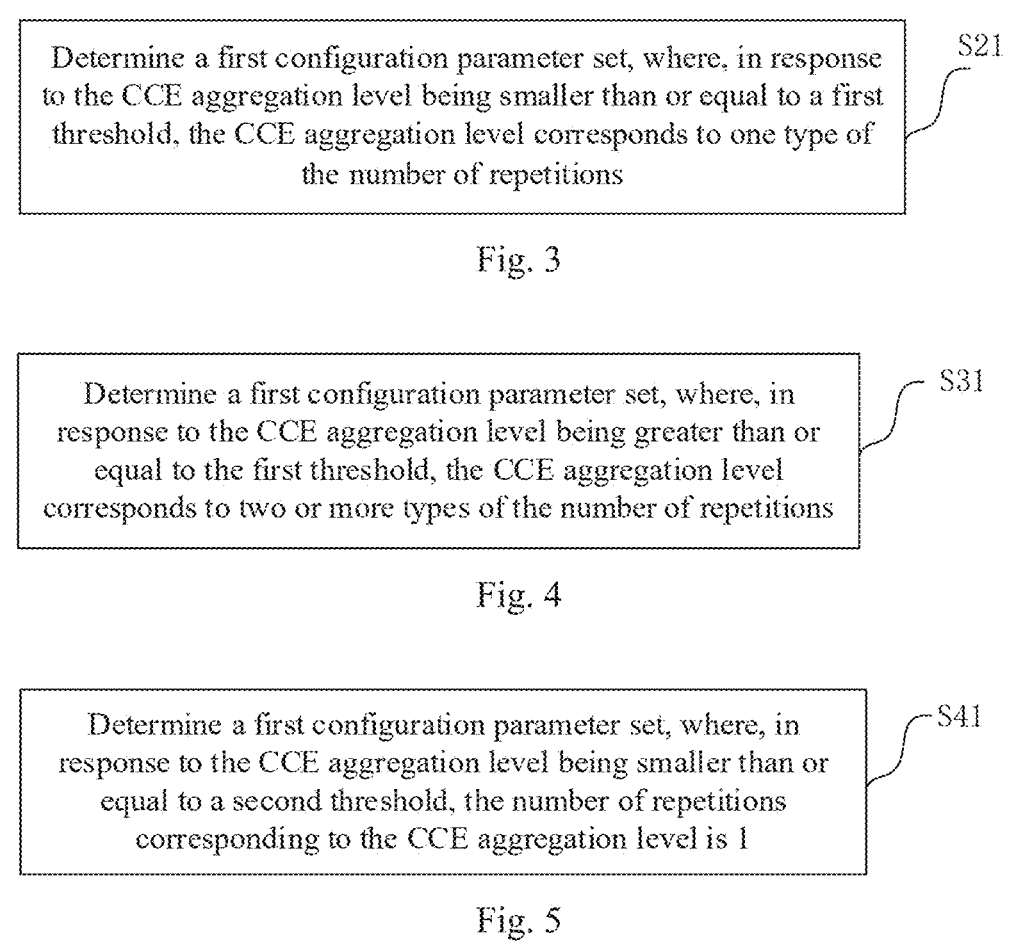

Determine a first configuration parameter set, where, in response to the CCE aggregation level being smaller than or equal to a first threshold, the CCE aggregation level corresponds to one type of the number of repetitions — S21

Fig. 3

Determine a first configuration parameter set, where, in response to the CCE aggregation level being greater than or equal to the first threshold, the CCE aggregation level corresponds to two or more types of the number of repetitions — S31

Fig. 4

Determine a first configuration parameter set, where, in response to the CCE aggregation level being smaller than or equal to a second threshold, the number of repetitions corresponding to the CCE aggregation level is 1 — S41

Fig. 5

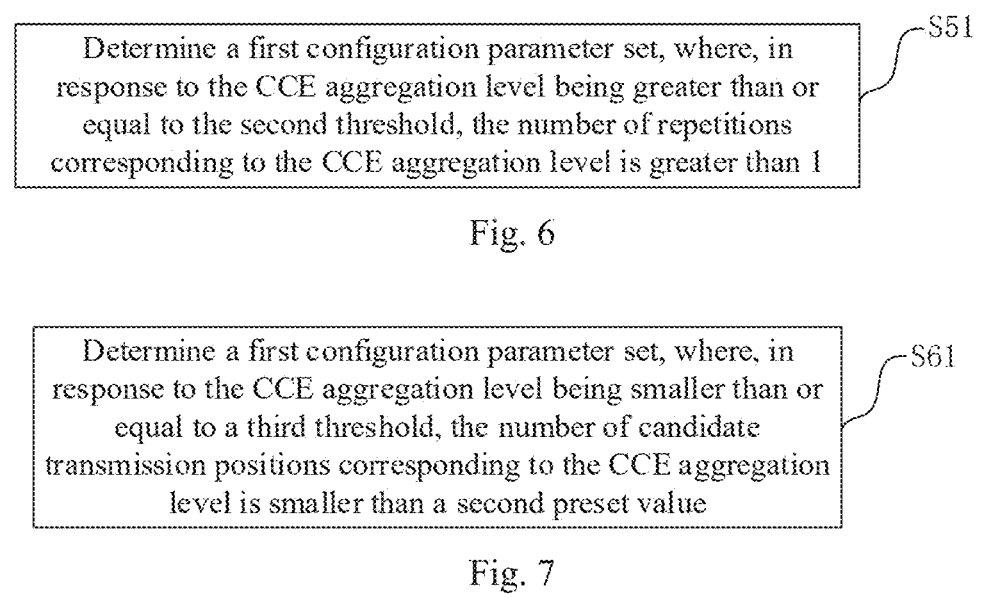

Determine a first configuration parameter set, where, in response to the CCE aggregation level being greater than or equal to the second threshold, the number of repetitions corresponding to the CCE aggregation level is greater than 1          ⌐S51

Fig. 6

Determine a first configuration parameter set, where, in response to the CCE aggregation level being smaller than or equal to a third threshold, the number of candidate transmission positions corresponding to the CCE aggregation level is smaller than a second preset value          ⌐S61

Fig. 7

Determine a first configuration parameter set, where, in
response to a repetition being performed on a physical
downlink control channel (PDCCH) for type 0 CSS, it is
determined to transmit the PDCCH based on a
predefined rule ⟋—S71

CONFIGURATION PARAMETER DETERMINATION METHOD, CONFIGURATION PARAMETER DETERMINATION APPARATUS, AND STORAGE MEDIUM

CROSS REFERENCE TO RELATED APPLICATION

The present application is a U.S. National Phase of International Application No. PCT/CN2020/141775 entitled "CONFIGURATION PARAMETER DETERMINATION METHOD, CONFIGURATION PARAMETER DETERMINATION APPARATUS, AND STORAGE MEDIUM," and filed on Dec. 30, 2020. The entire contents of the above-listed application are hereby incorporated by reference for all purposes.

BACKGROUND

In a wireless communication system, for scenarios of low rate, high delay, and the like of an Internet of Things service, a machine-type communication (MTC) technology and a narrow band Internet of Things (NB-IoT) technology are provided.

SUMMARY

The disclosure relates to the technical field of wireless communication, in particular to a configuration parameter determination method, a configuration parameter determination apparatus, and a storage medium.

According to a first aspect of an example of the disclosure, a configuration parameter determination method is provided, which includes:

determining a first configuration parameter set, where the first configuration parameter set is configured to determine a transmission resource in time domain for a first type of common search space; and the first configuration parameter set at least includes: a control channel element (CCE) aggregation level, and at least one of: a number of repetitions corresponding to the CCE aggregation level or a candidate transmission position corresponding to the CCE aggregation level.

According to a second aspect of an example of the disclosure, a configuration parameter determination apparatus is provided and includes:

a processor; and a memory configured to store processor-executable instructions; where the processor is configured to determine a first configuration parameter set, where the first configuration parameter set is configured to determine a transmission resource in time domain for a first type of common search space; and the first configuration parameter set at least includes: a control channel element (CCE) aggregation level, and at least one of: a number of repetitions corresponding to the CCE aggregation level or a candidate transmission position corresponding to the CCE aggregation level.

According to a third aspect of an example of the disclosure, a non-transitory computer-readable storage medium storing instructions is provided, where the instructions, when executed by a processor of a mobile terminal or a network device, cause the mobile terminal or the network device to determine a first configuration parameter set, where the first configuration parameter set is configured to determine a transmission resource in time domain for a first type of common search space; and the first configuration parameter set at least includes: a control channel element (CCE) aggregation level, and at least one of: a number of repetitions corresponding to the CCE aggregation level or a candidate transmission position corresponding to the CCE aggregation level.

It is to be understood that the above general description and the following detailed description are merely examples and explanatory, instead of limiting the disclosure.

BRIEF DESCRIPTION OF THE DRAWINGS

Accompanying drawings here, which are incorporated in and constitute a part of the specification, illustrate examples consistent with the disclosure and, together with the specification, serve to explain principles of the disclosure.

FIG. 3 is a flowchart of a configuration parameter determination method shown according to an example.

FIG. 4 is a flowchart of a configuration parameter determination method shown according to an example.

FIG. 5 is a flowchart of a configuration parameter determination method shown according to an example.

FIG. 6 is a flowchart of a configuration parameter determination method shown according to an example.

FIG. 7 is a flowchart of a configuration parameter determination method shown according to an example.

DETAILED DESCRIPTION

The examples will be described in detail here, and their instances are represented in the accompanying drawings. Unless otherwise indicated, when the following description refers to the accompanying drawings, the same number in the different accompanying drawings represents the same or similar element. Implementations described in the following examples do not represent all implementations consistent with the disclosure. Rather, they are merely examples of an apparatus and method consistent with some aspects of the disclosure as detailed in the appended claims.

In some embodiments, "at least one of A, B", "A and/or B", "in one case A, in another case B", "in response to a case A, in response to another case B", etc. are recorded in a manner that may include, depending on the context, the following technical solutions: in some embodiments A (executing A unrelated to B); in some embodiments B (executing B unrelated to A); in some embodiments selecting execution from A and B (A and B being selectively executed); in some embodiments A and B (both A and B are executed). The above is also similar when there are more branches, such as A, B, C, etc.

With the development of the Internet of Things service, the MTC technology and NB-IoT technology have been incapable of meeting the demand of the current Internet of Things service at a rate and with a delay. Thus, a new reduced capability (Redcap) UE is designed, which is NR light (NR-lite) for short, so as to meet the service demand of the Internet of Things. Due to the demand for a low cost and low complexity of the Redcap UE, and reduction of the number of antennas and bandwidth, a covering capability of the UE is reduced, and covering needs to be strengthened. However, if repetition is performed in a time domain, in the related art, the definition of a type 0 common search space (type 0 CSS) is on one slot, which cannot meet the demand of repetition in the time domain.

In order to overcome the problem in the related art, the disclosure provides a configuration parameter determination method, a configuration parameter determination apparatus, and a storage medium.

Figure 1:
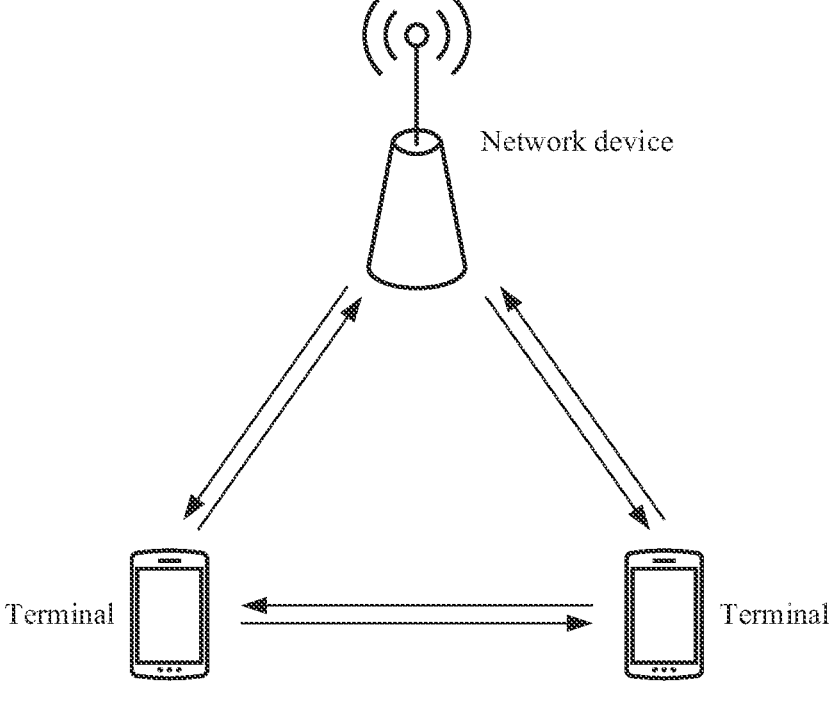
FIG. 1 is a diagram of an architecture of a communication system including a network device and a terminal, shown according to an example.

FIG. 1 is a diagram of an architecture of a communication system, including a network device and a terminal, shown according to an example. A configuration parameter determination method provided by the disclosure may be applied to the diagram of the architecture of the communication system shown in FIG. 1. As shown in FIG. 1, the network device may send signaling based on the architecture shown in FIG. 1.

It may be understood that the communication system of the network device and the terminal shown in FIG. 1 is merely schematic description, the wireless communication system may further include other network devices, for example, may further include a core network device, a wireless relay device, a wireless backhaul device and the like, not shown in FIG. 1. The example of the disclosure does not limit the number of network devices and the number of terminals included in the wireless communication system.

It may be further understood that the wireless communication system in the example of the disclosure is a network providing a wireless communication function. The wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. According to factors of capacities, rates, delays, and the like of different networks, the networks may be divided into a 2G (generation) network, a 3G network, a 4G network, or a future evolution network, such as a 5G network, which may also be called a new radio (NR). For a convenient description, in the disclosure, the wireless communication network is sometimes called a network for short.

Further, the network device involved in the disclosure may also be called a wireless access network device. The wireless access network device may be: a base station, an evolved NodeB, a home NodeB, an access point (AP) in a wireless fidelity (WIFI) system, a wireless relay node, a wireless backhaul node, a transmission point (TP), a transmission and reception point (TRP), or the like, and may further be gNB in an NR system, or may further be a component or a part of devices constituting the base station, or the like. When it is a Vehicle-to-Everything (V2X) communication system, the network device may further be a vehicle-mounted device. It is to be understood that in the example of the disclosure, a specific technology and a specific device form of the network device are not limited.

Further, the terminal involved in the disclosure may also be called a terminal device, user equipment (UE), a mobile station (MS), a mobile terminal (MT), or the like and is a device providing voice and/or data connectivity for a user, for example, the terminal may be a hand-held device, a vehicle-mounted device or the like with a wireless connection function. At present, examples of some terminals are: a mobile phone, a pocket personal computer (PPC), a palmtop computer, a personal digital assistant (PDA), a notebook computer, a tablet computer, a wearable device, a vehicle-mounted device, or the like. Besides, when it is a Vehicle-to-Everything (V2X) communication system, the terminal device may further be a vehicle-mounted device. It is to be understood that in the example of the disclosure, a specific technology and a specific device form of the terminal are not limited.

The reduced capability UE proposes two main technologies such as a machine-type communication (MTC) technology and a narrow band Internet of Thing (NB-IoT) technology in a communication system such as a long term evolution (LTE) fourth-generation mobile communication technology (4G) system to support an Internet of Things service, and the two main technologies are mainly for scenarios of low rate, high delay and the like, such as scenarios of meter reading and environment monitoring. The largest transmission rate supported by the NB-IoT technology is several hundreds of kilobits per second (kbps). The largest transmission rate supported by the MTC technology is currently several million bits per second (Mbps). However, with continuous development of Internet services, such as, popularization of video monitor, smart home, a wearable device, an industrial sensor monitoring and other services, a transmission rate usually required by these services is dozens of Mbps to 100 Mbps, and meanwhile, the above services also have a relatively high demand for delay, so the MTC technology and the NB-IoT technology in LTE hardly meet the demand of the above services. Based on this case, designing new user equipment in 5G NR starts to be proposed so as to meet the demand of a terminal Internet of Things device. In the current 3rd generation partnership project (3GPP) standardization, this new terminal type is called reduced capability UE. Reduction of capability or covering capability of the Redcap terminal may cause coverage loss, so the coverage needs to be strengthened. For example, in the Redcap terminal, simulation evaluation is under 4 GHz, and a broadcast physical downlink control channel (PDCCH) needs to be strengthened. Strengthening covering for the broadcast PDCCH may be to perform repetition in the time domain.

However, in the related art, a standard definition of a type 0 common search space (type 0 CSS) includes one slot, and if repetition in the time domain is performed, the search space needs to be redefined so as to include extension in the time domain.

In the related art, a CCE aggregation level included in the type 0 CSS, and the number of candidate transmission positions included in each CCE aggregation level may refer to Table 1.

TABLE 1

| CCE aggregation level | Number of candidate transmission positions |
| --- | --- |
| 4 | 4 |
| 8 | 2 |
| 16 | 1 |

It may be understood that each element in Table 1 is independent, and these elements are listed in the same table as an example, which does not represent that all the elements in the table have to be present at the same time, as shown in the table. A value of each element does not rely on a value of any other element in Table 1. Thus, those skilled in the art may understand that the value of each element in Table 1 is an independent example.

Based on this, the disclosure provides a configuration parameter determination method. A time domain of a search space is extended, a dimension is added to the time domain, the added dimension is the number of repetitions, for indicating a terminal to determine the number of repetitions, and thus the purpose of time-domain repetition is achieved.

Figure 2:
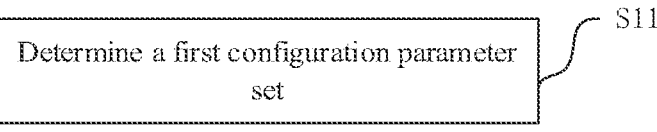
FIG. 2 is a flowchart of a configuration parameter determination method shown according to an example.

FIG. 2 is a flowchart of a configuration parameter determination method shown according to an example. As shown in FIG. 2, the configuration parameter determination method includes the following steps.

In step S11, a first configuration parameter set is determined.

In the example of the disclosure, the first configuration parameter set is configured to determine a transmission resource in the time domain for a first type of common search space. The first configuration parameter set at least includes a control channel element (CCE) aggregation level, and at least one of: the number of repetitions corresponding to the CCE aggregation level or a candidate transmission position corresponding to the CCE aggregation level.

It needs to be noted that the configuration parameter determination method provided by the disclosure may be applied to a terminal or a network device, which is not specifically limited here.

In some examples of the disclosure, in the first configuration parameter set, each CCE aggregation level corresponds to the number of repetitions, and there are one or more types of the number of repetitions. Further, the same CCE aggregation level and the corresponding number of repetitions may have different combinations; the number of candidate transmission positions exists under each combination correspondingly, and the number of the corresponding candidate transmission positions under each combination may be different or the same.

In the example of the disclosure, the CCE aggregation level and the first threshold are determined, and the first threshold represents the number of CCEs included in the CCE aggregation level. In the disclosure, the first threshold may be 4, which is merely an example and is not a specific limitation on the disclosure.

The technical solutions provided by the examples of the disclosure may include the following beneficial effects: in the disclosure, the first configuration parameter set is determined, according to the CCE aggregation level and at least one of the number of repetitions corresponding to the CCE aggregation level or the candidate transmission position corresponding to the CCE aggregation level included in the first configuration parameter set, the transmission resource in the time domain for the first type of common search space is determined, and a repetition is allowed to be performed in the time domain, so that the covering capability of a terminal is strengthened.

FIG. 3 is a flowchart of a configuration parameter determination method shown according to an example. As shown in FIG. 3, the configuration parameter determination method includes the following steps.

In step S21, the first configuration parameter set is determined, where, in response to the CCE aggregation level being smaller than or equal to a first threshold, the CCE aggregation level corresponds to one type of the number of repetitions.

In an implementation, in response to the CCE aggregation level being smaller than or equal to the first threshold, in other words, determining that the number of CCEs included in the CCE aggregation level is smaller than or equal to the first threshold, determining that the type of the number of repetitions corresponding to the CCE aggregation level is one.

FIG. 4 is a flowchart of a configuration parameter determination method shown according to an example. As shown in FIG. 4, the configuration parameter determination method includes the following steps.

In step S31, the first configuration parameter set is determined, where, in response to the CCE aggregation level being greater than or equal to the first threshold, the CCE aggregation level corresponds to two or more types of the number of repetitions.

In an implementation, in response to the CCE aggregation level being greater than or equal to the first threshold, in other words, determining that the number of CCEs included in the CCE aggregation level is greater than or equal to the first threshold, determining that the types of the number of repetitions corresponding to the CCE aggregation level are two or more, for example, there are two types of the number of repetitions or there are three types of the number of repetitions.

FIG. 5 is a flowchart of a configuration parameter determination method shown according to an example. As shown in FIG. 5, the configuration parameter determination method includes the following steps.

In step S41, the first configuration parameter set is determined, where, in response to the CCE aggregation level being smaller than or equal to a second threshold, the number of repetitions corresponding to the CCE aggregation level is 1.

In the example of the disclosure, the second threshold may be the same as the first threshold or not.

For example, taking the second threshold being 4 as an example, that is, in response to the number of CCEs included in the CCE aggregation level being 4, determining that the type of the number of repetitions corresponding to the CCE aggregation level is 1, and the number of repetitions may be 1.

FIG. 6 is a flowchart of a configuration parameter determination method shown according to an example. As shown in FIG. 6, the configuration parameter determination method includes the following steps.

In step S51, the first configuration parameter set is determined, where, in response to the CCE aggregation level being greater than or equal to the second threshold, the number of repetitions corresponding to the CCE aggregation level is greater than 1.

In some examples of the disclosure, the second threshold may be the same as the first threshold or not.

For example, in response to the number of CCEs included in the CCE aggregation level being 8, determining that the types of the number of repetitions corresponding to the CCE aggregation level are two or more, for example, the number of repetitions may include two or more of one time, two times, or four times.

In the example of the disclosure, values of the number of repetitions corresponding to the different CCE aggregation levels may be the same or not, or partially the same.

In an implementation, taking the values of the number of repetitions corresponding to each CCE aggregation level to be the same as an example, the number of CCEs included in the CCE aggregation level is 4, so the value of the corresponding number of repetitions is 1; the number of CCEs included in the CCE aggregation level is 8, so the value of the corresponding number of repetitions is 1; and the number of CCEs included in the CCE aggregation level is 16, so the value of the corresponding number of repetitions is 1.

In an implementation, taking the values of the number of repetitions corresponding to each CCE aggregation level to be not the same as an example, the number of CCEs included in the CCE aggregation level is 4, so the value of the corresponding number of repetitions is 1; the number of CCEs included in the CCE aggregation level is 8, so the value of the corresponding number of repetitions is 4; and the number of CCEs included in the CCE aggregation level is 16, so the value of the corresponding number of repetitions is 2.

In an implementation, taking the values of the number of repetitions corresponding to each CCE aggregation level to be partially the same as an example, the number of CCEs included in the CCE aggregation level is 4, so the value of the corresponding number of repetitions is 1; the number of CCEs included in the CCE aggregation level is 8, so the values of the corresponding number of repetitions are 1 and 2, or 1, 2 and 4; and the number of CCEs included in the CCE aggregation level is 16, so the values of the corresponding number of repetitions are 1 and 2.

In the example of the disclosure, as described above, the same CCE aggregation level and the corresponding number of repetitions may have different combinations. The number of candidate transmission positions exists under each combination correspondingly, and the sum of the number of corresponding candidate transmission positions under each combination is a first preset value. In other words, the sum of the number of PDCCH blind detections in the time domain for the first type of common search space is the first preset value. The first preset value is predefined, for example, may be 7 times. Certainly, this is merely an example and is not a specific limitation on the disclosure.

FIG. 7 is a flowchart of a configuration parameter determination method shown according to an example. As shown in FIG. 7, the configuration parameter determination method includes the following steps.

In step S61, the first configuration parameter set is determined, where, in response to the CCE aggregation level being smaller than or equal to a third threshold, the number of candidate transmission positions corresponding to the CCE aggregation level is smaller than a second preset value.

In some examples of the disclosure, in response to the CCE aggregation level being smaller than or equal to a third threshold, determining that the number of the corresponding candidate transmission positions under all combinations of the CCE aggregation level and the corresponding number of repetitions is smaller than the second threshold. The first threshold is used for determining a relatively low CCE aggregation level, for example, the first threshold is 4, and it is determined that the CCE aggregation level includes four CCEs, so the number of the candidate transmission positions corresponding to the combinations of the CCE aggregation level and the number of repetitions is determined to be smaller than the second threshold, where the second threshold may be 4. In other words, it is determined that the CCE aggregation level includes four CCEs, so the number of the candidate transmission positions corresponding to the combinations of the CCE aggregation level and the number of repetitions is smaller than 4, for example, the combination of the CCE aggregation level including four CCEs and the number of repetitions may correspond to three candidate transmission positions, or may correspond to two candidate transmission positions.

In some examples of the disclosure, each CCE aggregation level may correspond to a different number of repetitions, and the combinations of all the CCE aggregation levels and the different numbers of repetitions correspond to different numbers of candidate transmission positions. For example, a reference may be made to Table 2, Table 3, and Table 4. It needs to be noted that Table 2, Table 3, and Table 4 in the example of the disclosure are different implementations capable of being used separately, which is not limited to the example of the disclosure.

TABLE 2

| CCE aggregation level | Number of retransmissions | Number of candidate transmission positions |
|---|---|---|
| 4 | 1 | 2 |
| 8 | 1 | 1 |
| 8 | 2 | 1 |
| 8 | 4 | 1 |
| 16 | 1 | 1 |
| 16 | 2 | 1 |

TABLE 3

| CCE aggregation level | Number of retransmissions | Number of candidate transmission positions |
|---|---|---|
| 4 | 1 | 2 |
| 8 | 1 | 2 |
| 8 | 4 | 1 |
| 16 | 1 | 1 |
| 16 | 2 | 1 |

TABLE 4

| CCE aggregation level | Number of retransmissions | Number of candidate transmission positions |
|---|---|---|
| 4 | 1 | 3 |
| 8 | 1 | 2 |
| 16 | 1 | 1 |
| 16 | 2 | 1 |

It may be understood that each element in Table 2, Table 3, and Table 4 is independent, and these elements are listed in the same table as an example, which does not represent that all the elements in the table have to be present at the same time, as shown in the table. A value of each element does not rely on a value of any other element in Table 2, Table 3, and Table 4. Thus, those skilled in the art may understand that the value of each element in Table 2, Table 3, and Table 4 is an independent example.

In the example of the disclosure, the first type of common search space may be a type 0 common search space (type 0 CSS).

It may be seen with reference to any example in Table 2, Table 3 and Table 4 that in the example of the disclosure, a dimension of the time domain is added into the type 0 CSS configuration parameter set shown in Table 1 in the related art, and its definition contains the CCE aggregation level, the supported number of repetitions corresponding to each CCE aggregation level, and the number of corresponding candidate transmission positions under the combination of each CCE and the number of repetitions. Compared with the parameter set shown in Table 1 in the related art, this dimension of the CCE aggregation level is added to the first configuration parameter set provided in some examples of the disclosure, but finally, the total number of PDCCH blind detections for the type 0 CSS of the first configuration parameter set in any example as shown in Table 2, Table 3 and Table 4 remains unchanged compared with the parameter set as shown in Table 1 in the related art. In the first configuration parameter set provided in some examples of the disclosure, the number of repetitions supported under each CCE aggregation level is not the same. In the first configuration parameter set provided in some examples of the disclosure, merely the PDCCH with a larger CCE aggregation level supports more than one repetition. In the first configuration parameter set provided in some examples of the disclosure, the number of candidate transmission positions corresponding to the PDCCH with the lower CCE aggregation level is smaller than that in type 0 CSS of the parameter set shown in Table 1 in the related art.

Figures 8, 9:
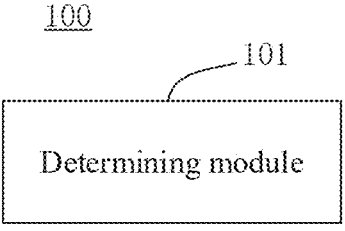
FIG. 8 is a flowchart of a configuration parameter determination method shown according to an example.
FIG. 9 is a block diagram of a configuration parameter determination apparatus shown according to an example.

FIG. 8 is a flowchart of a configuration parameter determination method shown according to an example. As shown in FIG. 8, the configuration parameter determination method includes the following steps.

In Step S71, a first configuration parameter set is determined, where, in response to a repetition being performed on a physical downlink control channel (PDCCH) for type 0 CSS, it is determined to transmit the PDCCH based on a predefined rule.

The first configuration parameter set determined in step S71 may be the first configuration parameter set determined based on any other example of the disclosure, which is not limited to the example of the disclosure.

In the example of the disclosure, it is determined that the PDCCH needs to be repeatedly transmitted; that is, in response to the repetition being performed on the PDCCH for type 0 CSS, the repeated PDCCH is determined to be transmitted based on the predefined rule.

In the example of the disclosure, the predefined rule may include at least one of the following:

the same candidate transmission position; or the same CCE index.

In other words, the PDCCH needing to be transmitted repeatedly may be transmitted on an index of the same PDCCH candidate transmission position, or the PDCCH needing to be transmitted repeatedly may be transmitted on a symbol associated with the PDCCH candidate transmission position, for example, a CCE index corresponding to the PDCCH candidate transmission position.

Any example of the disclosure may be applied to a terminal, a base station, or the network device, which is not limited to the example of the disclosure.

Based on the same concept, an example of the disclosure further provides a configuration parameter determination apparatus.

It may be understood that in order to implement the above functions, the configuration parameter determination apparatus provided by the example of the disclosure contains corresponding hardware structures and/or software modules for executing each function. In combination with units and algorithm steps of all examples disclosed in the example, the example of the disclosure can be implemented in the form of hardware or a combination of hardware and computer software. Whether a certain function is executed by the hardware or by driving the hardware through the computer software depends on a specific application and a design constraint condition of a technical solution. Those skilled in the art may implement the described functions for each specific application by using different methods. Still, this implementation is not regarded as departing from the scope of the technical solution of the example of the disclosure.

FIG. 9 is a block diagram of a configuration parameter determination apparatus shown according to an example. Referring to FIG. 9, the configuration parameter determination apparatus 100 includes a determining module 101.

The determining module 101 is configured to determine a first configuration parameter set, and the first configuration parameter set is configured to determine a transmission resource in the time domain for a first type of common search space. The first configuration parameter set at least includes a control channel element (CCE) aggregation level, and at least one of: the number of repetitions corresponding to the CCE aggregation level, or a candidate transmission position corresponding to the CCE aggregation level.

In the example of the disclosure, the determining module 101 is further configured to determine that the CCE aggregation level corresponds to one type of the number of repetitions in response to the CCE aggregation level being smaller than or equal to a first threshold, or determine that the CCE aggregation level corresponds to two or more types of the number of repetitions in response to the CCE aggregation level being greater than or equal to the first threshold.

In the example of the disclosure, the determining module 101 is further configured to determine that the number of repetitions corresponding to the CCE aggregation level is 1 in response to the CCE aggregation level being smaller than or equal to a second threshold; or determine that the number of repetitions corresponding to the CCE aggregation level is greater than 1 in response to the CCE aggregation level being greater than or equal to the second threshold.

In the example of the disclosure, the values of the number of repetitions corresponding to the same CCE aggregation level are different.

In the example of the disclosure, the sum of the number of candidate transmission positions is a first preset value.

In the example of the disclosure, the determining module 101 is further configured to determine that the number of candidate transmission positions corresponding to the CCE aggregation level is smaller than a second preset value in response to the CCE aggregation level being smaller than or equal to a third threshold.

In the example of the disclosure, the first type of common search space is a type 0 common search space (type 0 CSS).

In the example of the disclosure, the determining module 101 is further configured to determine to transmit the PDCCH based on a predefined rule in response to the repetition being performed on the PDCCH for type 0 CSS.

In the example of the disclosure, the predefined rule includes at least one of the following:

the same candidate transmission position, or the same CCE index.

As for the apparatus in the above example, a specific mode of each module for executing an operation has been described in detail in the example related to the method, which is not described in detail here.

Figure 10:
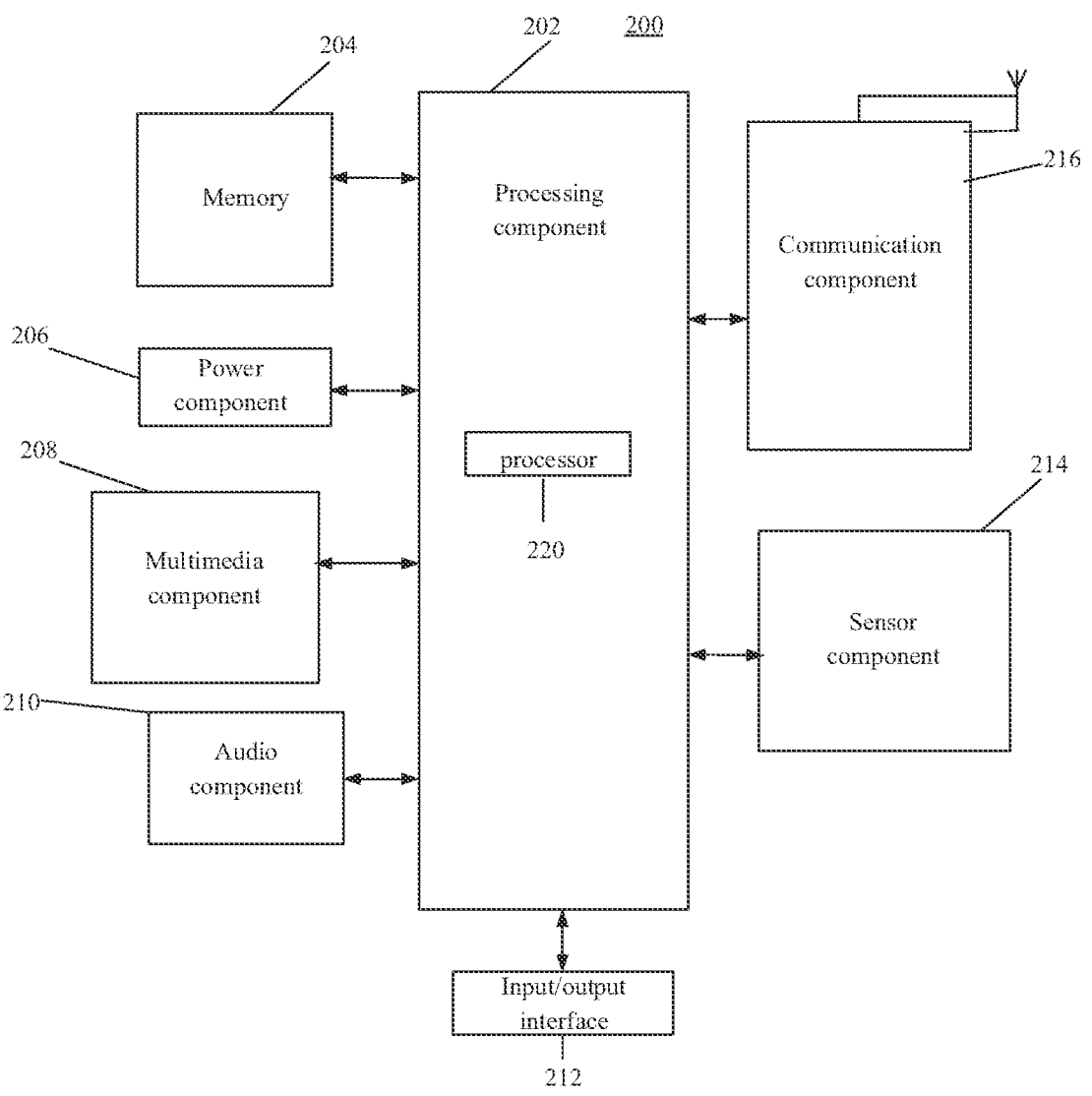
FIG. 10 is a block diagram of an apparatus for configuration parameter determination shown according to an example.

FIG. 10 is a block diagram of an apparatus 200 for configuration parameter determination shown according to an example. For example, the apparatus 200 may be a mobile phone, a computer, a digital broadcast terminal, a messaging device, a game console, a tablet device, a medical device, a fitness facility, a personal digital assistant, and the like.

Referring to FIG. 10, the apparatus 200 may include one or more components as follows: a processing component 202, a memory 204, a power component 206, a multimedia component 208, an audio component 210, an input/output (I/O) interface 212, a sensor component 214, and a communication component 216.

The processing component 202 generally controls the whole operation of the apparatus 200, such as operations related to display, phone call, data communication, camera operation, and recording operation. The processing component 202 may include one or more processors 220 for executing instructions so as to complete all or part of the steps of the above method. Besides, the processing component 202 may include one or more modules to facilitate interaction between the processing component 202 and the other components. For example, the processing component 202 may include a multimedia module so as to facilitate interaction between the multimedia component 208 and the processing component 202.

The memory 204 is configured to store various types of data so as to support operations on the apparatus 200. Examples of these data include instructions of any application program or method for operation on the apparatus 200, contact person data, telephone directory data, messages, pictures, videos, and the like. The memory 204 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 206 provides power for various components of the apparatus 200. The power component 206 may include a power management system, one or more power sources, and other components related to power generation, management, and distribution for the apparatus 200.

The multimedia component 208 includes a screen that provides an output interface between the apparatus 200 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors so as to sense touching, swiping, and gestures on the touch panel. The touch sensor can not only sense a boundary of a touching or swiping action, but also detect duration and pressure related to a touching or swiping operation. In some examples, the multimedia component 208 includes a front camera and/or a back camera. When the apparatus 200 is in an operation mode, such as a photographing mode or a video mode, the front camera and/or the back camera can receive external multimedia data. Each front camera and each back camera may be a fixed optical lens system or have a focal length and an optical zoom capability.

The audio component 210 is configured to output and/or input an audio signal. For example, the audio component 210 includes a microphone (MIC). When the apparatus 200 is in the operation mode, such as a call mode, a recording mode, and a voice recognition mode, the microphone is configured to receive an external audio signal. The received audio signal may be further stored in the memory 204 or sent via the communication component 216. In some examples, the audio component 210 further includes a speaker for outputting the audio signal.

The I/O interface 212 provides an interface between the processing component 202 and a peripheral interface module, and the above peripheral interface module may be a keyboard, a click wheel, buttons, and the like. These buttons may include, but are not limited to: a home button, a volume button, a start button, and a lock button.

The sensor component 214 includes one or more sensors, configured to provide state evaluation of various aspects for the apparatus 200. For example, the sensor component 214 may detect a start/shut-down state of the apparatus 200 and relative positioning of the components, for example, the components are a display and a keypad of the apparatus 200. The sensor component 214 may further detect location change of the apparatus 200 or one component of the apparatus 200, whether there is contact between the user and the apparatus 200, azimuth or speed up/speed down of the apparatus 200, and temperature change of the apparatus 200. The sensor component 214 may include a proximity sensor, configured to detect the existence of a nearby object without any physical contact. The sensor component 214 may further include an optical sensor, such as a CMOS or CCD image sensor, for use in an imaging application. In some examples, the sensor component 214 may further include an acceleration sensor, a gyroscope sensor, a magnetic sensor, a pressure sensor, or a temperature sensor.

The communication component 216 is configured to facilitate wired or wireless communication between the apparatus 200 and other devices. The apparatus 200 may be accessed to a wireless network based on a communication standard, such as WiFi, 2G, 3G, or their combination. In an example, the communication component 216 receives a broadcast signal or related broadcast information from an external broadcast management system via a broadcast channel. In an example, the communication component 216 further includes a near-field communication (NFC) module so as to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the apparatus 200 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontroller units, microprocessors, or other electronic elements for executing the above method.

In an example, a non-transitory computer-readable storage medium including instructions is further provided, such as a memory 204 including the instructions. The above instructions may be executed by a processor 220 of an apparatus 200 so as to complete the above method. For example, the non-transitory computer-readable storage medium may be a ROM, a random access memory (RAM), a CD-ROM, a magnetic tape, a floppy disk, an optical data storage device, etc.

Figure 11:
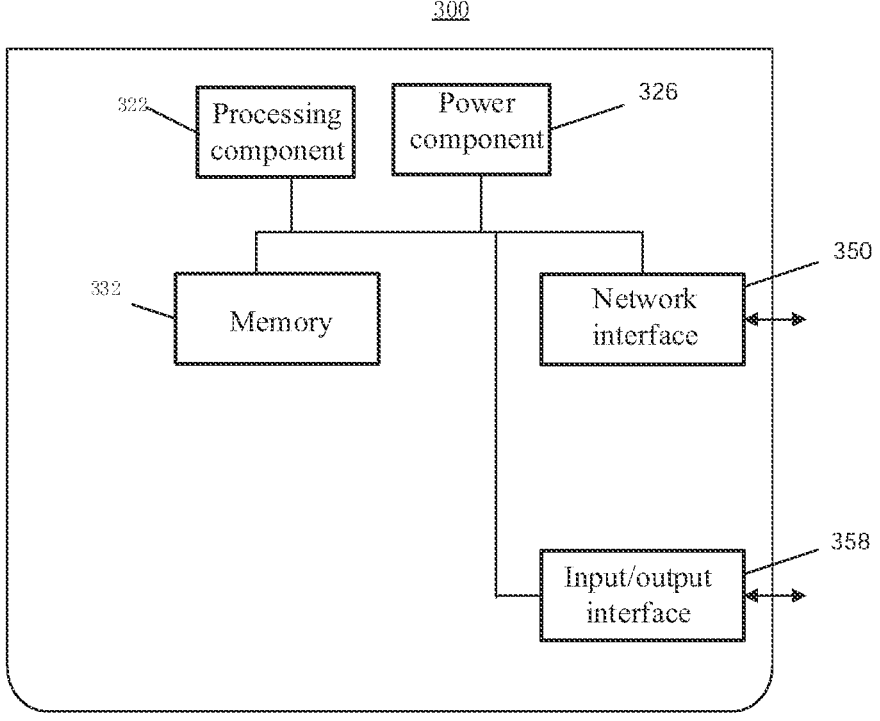
FIG. 11 is a block diagram of an apparatus for configuration parameter determination shown according to an example.

FIG. 11 is a block diagram of an apparatus 300 for configuration parameter determination, shown according to an example. For example, the apparatus 300 may be provided as a server. Referring to FIG. 11, the apparatus 300 includes a processing component 322, which further includes one or more processors and a memory resource represented by a memory 332, configured to store an instruction capable of being executed by the processing component 322, for example, an application program. The application program stored in the memory 332 may include one or more modules, each corresponding to a set of instructions. Besides, the processing component 322 is configured to execute an instruction so as to execute the above configuration parameter determination method.

The apparatus 300 may further include a power component 326 configured to execute power management of the apparatus 300, a wired or wireless network interface 350 configured to connect the apparatus 300 to a network, and an input/output (I/O)) interface 358. The apparatus 300 may operate an operating system stored in the memory 332, for example, Windows Server™, Mac OS X™, Unix™, Linux™, FreeBSD™, or the like.

It may be further understood that "plurality" in the disclosure refers to two or more, and the other quantifiers are similar to this. "And/or" describes an association relationship between associated objects and represents that there may be three relationships, for example, A and/or B, which represents that merely A exists, both A and B exist, and merely B exists. A character "/" generally represents an "or" relationship between associated objects before and after the character. The singular forms "a/an", "the", and "said" intend to include a plural form unless other meanings are indicated clearly in the context.

It may be further understood that terms, such as "first" and "second", are used to describe various information, but the information is not limited by these terms. These terms are merely used for distinguishing the same type of information and do not represent a specific sequence or significance. Actually, "first", "second", and the like may be completely interchangeable. For example, without departing from the scope of the disclosure, first information may also be called second information, and similarly, the second information may also be called the first information.

It may be further understood that the operations in the examples of the disclosure are described in a specific sequence in the accompanying drawings, but it is not understood as requiring these operations to be executed in the specific sequence or a serial sequence as shown, or requiring all the shown operations to be executed to achieve an expected result. In a specific environment, multi-tasking and parallel processing are possibly beneficial.

Those skilled in the art will easily figure out other implementation solutions of the disclosure after considering the specification and practicing the disclosure disclosed here. The present application intends to cover any transformation, purpose, or adaptive change of the disclosure which conforms to a general principle of the disclosure and includes common general knowledge or conventional technical means which are not disclosed by the disclosure in the technical field. The specification and the examples are merely regarded as examples, and the true scope and spirit of the disclosure are indicated by the following claims.

It is to be understood that the disclosure is not limited to the accurate structure described above and shown in the accompanying drawings, and various modifications and changes can be made without departing from its scope. The scope of the disclosure is limited merely by appended claims.

What is claimed is:

1. A configuration parameter determination method, comprising:

determining a configuration parameter set, wherein the configuration parameter set is configured to determine a transmission resource in time domain for a first type of common search space; and the configuration parameter set at least comprises: a control channel element (CCE) aggregation level, and at least one of: a number of repetitions corresponding to the CCE aggregation level or a candidate transmission position corresponding to the CCE aggregation level; and wherein values of the number of repetitions corresponding to same CCE aggregation level are different, and a sum of a number of candidate transmission positions is a first preset value.

2. The configuration parameter determination method according to claim 1, wherein the CCE aggregation level is smaller than or equal to a first threshold, and the CCE aggregation level corresponds to one type of the number of repetitions; or the CCE aggregation level is greater than or equal to the first threshold, and the CCE aggregation level corresponds to two or more types of the number of repetitions.

3. The configuration parameter determination method according to claim 1, wherein the CCE aggregation level is smaller than or equal to a second threshold, and the number of repetitions corresponding to the CCE aggregation level is 1; or the CCE aggregation level is greater than or equal to the second threshold, and the number of repetitions corresponding to the CCE aggregation level is greater than 1.

4. The configuration parameter determination method according to claim 1, wherein the CCE aggregation level is smaller than or equal to a third threshold, and a number of candidate transmission positions corresponding to the CCE aggregation level is smaller than a second preset value.

5. The configuration parameter determination method according to claim 1, wherein the first type of common search space is a type 0 common search space (type 0 CSS).

6. The configuration parameter determination method according to claim 5, further comprising:

determining to transmit a physical downlink control channel (PDCCH) based on a predefined rule in a case where a repetition is performed on the PDCCH for type 0 CSS.

7. The configuration parameter determination method according to claim 6, wherein the predefined rule comprises at least one of the following:

same candidate transmission position; or same CCE index.

8. A configuration parameter determination apparatus, comprising:

a processor; and a memory configured to store processor-executable instructions; wherein the processor-executable instructions, when executed by the processor, cause the processor to determine a configuration parameter set, wherein the configuration parameter set is configured to determine a transmission resource in time domain for a first type of common search space, and the configuration parameter set at least comprises: a control channel element (CCE) aggregation level, and at least one of: a number of repetitions corresponding to the CCE aggregation level or a candidate transmission position corresponding to the CCE aggregation level; and wherein values of the number of repetitions corresponding to same CCE aggregation level are different, and a sum of a number of candidate transmission positions is a first preset value.

9. The configuration parameter determination apparatus according to claim 8, wherein the CCE aggregation level is smaller than or equal to a first threshold, and the CCE aggregation level corresponds to one type of the number of repetitions; or the CCE aggregation level is greater than or equal to the first threshold, and the CCE aggregation level corresponds to two or more types of the number of repetitions.

10. The configuration parameter determination apparatus according to claim 8, wherein the CCE aggregation level is smaller than or equal to a second threshold, and the number of repetitions corresponding to the CCE aggregation level is 1; or the CCE aggregation level is greater than or equal to the second threshold, and the number of repetitions corresponding to the CCE aggregation level is greater than 1.

11. The configuration parameter determination apparatus according to claim 8, wherein the CCE aggregation level is smaller than or equal to a third threshold, and a number of candidate transmission positions corresponding to the CCE aggregation level is smaller than a second preset value.

12. The configuration parameter determination apparatus according to claim 8, wherein the first type of common search space is a type 0 common search space (type 0 CSS).

13. The configuration parameter determination apparatus according to claim 12, the processor is further configured to:

determine to transmit a physical downlink control channel (PDCCH) based on a predefined rule in a case where a repetition is performed on the PDCCH for type 0 CSS.

14. The configuration parameter determination apparatus according to claim 13, wherein the predefined rule comprises at least one of the following:

same candidate transmission position; or same CCE index.

15. A non-transitory computer-readable storage medium storing instructions, wherein the instructions, when executed by a processor of a mobile terminal or a network device, cause the mobile terminal or the network device to determine a configuration parameter set, wherein the configuration parameter set is configured to determine a transmission resource in time domain for a first type of common search space, and the configuration parameter set at least comprises: a control channel element (CCE) aggregation level, and at least one of: a number of repetitions corresponding to the CCE aggregation level or a candidate transmission position corresponding to the CCE aggregation level; and wherein values of the number of repetitions corresponding to same CCE aggregation level are different, and a sum of a number of candidate transmission positions is a first preset value.

16. The non-transitory computer-readable storage medium according to claim 15, wherein the CCE aggregation level is smaller than or equal to a first threshold, and the CCE aggregation level corresponds to one type of the number of repetitions; or the CCE aggregation level is greater than or equal to the first threshold, and the CCE aggregation level corresponds to two or more types of the number of repetitions.

* * * * *